United States Patent [19]

Eiter et al.

[11] 3,853,852

[45] Dec. 10, 1974

[54] NEW NITROFURAN DERIVATIVES, THEIR PRODUCTION AND USE

[75] Inventors: Karl Eiter; Klaus-Friedrich Hebenbrock, both of Koeln; Manfred Plempel, Wuppertal-Elberfeld, all of Germany

[73] Assignee: Bayer Aktiengesellschaft, Leverkusen, Germany

[22] Filed: July 24, 1973

[21] Appl. No.: 382,212

Related U.S. Application Data

[63] Continuation-in-part of Ser. No. 162,003, July 12, 1971, abandoned.

[30] Foreign Application Priority Data

July 18, 1970 Germany............................ 2035797

[52] U.S. Cl.... 260/239.3 R, 260/244 R, 260/307 F, 424/244, 424/248, 424/272

[51] Int. Cl. ...................... C07d 85/44, C07d 87/20

[58] Field of Search.................. 260/244, 307, 239.3

[56] References Cited

UNITED STATES PATENTS

3,574,201   4/1971   Bruer................................ 260/244

*Primary Examiner*—Harry I. Moatz

[57] ABSTRACT

3-Carbonyl derivatives of 2-(-5-nitrofuryl-2)-tetrahydrooxazines and -oxazolidines are anti-microbial agents. The compounds are prepared from the corresponding 3-nitroso compounds, on one or more steps, through treatment with an acid halide. A typical embodiment is 3-carbamylcarbonyl-2-(5-nitrofuryl-2)-tetrahydrooxazine-1,3.

21 Claims, No Drawings

NEW NITROFURAN DERIVATIVES, THEIR PRODUCTION AND USE

CROSS REFERENCE

This is a continuation-in-part of Ser. No. 162,003 filed July 12, 1971, now abandoned.

DETAILED DESCRIPTION

This invention relates to new nitrofuran derivatives, to a process for their production, and their use as medicines, especially as anti-microbial agents.

The new nitrofuran derivatives of the invention are compounds of the formula:

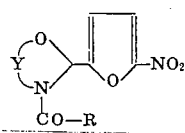
(1)

in which
Y is an optionally substituted organic bifunctional radical; and
R is: optionally substituted lower alkyl group;
a group of the formula:

(2)

in which $R^1$ and $R^2$ are identical or different and are each hydrogen or an optionally substituted alkyl, aryl, aralkyl, or heterocyclic radical or, together with the nitrogen atom to which they are attached, form an optionally substituted heterocyclic ring;
a group of the formula:

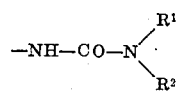
(3)

in which $R^1$ and $R^2$ are as defined above;
a group of the formula:

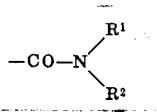
(4)

in which $R^1$ and $R^2$ are as defined above; the group —$COOR^3$ in which $R^3$ is hydrogen or an optionally substituted alkyl, cycloalkyl, aralkyl, aryl or heterocyclic radical; the group —$NHCOOR^4$ in which $R^4$ is an optionally substituted alkyl, aralkyl, aryl or heterocyclic radical; the group $OR^3$ in which $R^3$ is as defined above.

The bifunctional organic radical Y can be of the formula:

(5)

in which
n is 2 or 3; and
R' and R'' are identical or different and are each hydrogen; lower alkyl group; halogeno; a nitro ester group, or lower alkyl ester; an aryl ester group with preferably six carbon atoms in the aryl radical; or an alkoxy or aryloxy group with preferably one to four carbon atoms in the alkyl radical and preferably six carbon atoms in the aryl radical.

Furthermore, two adjacent carbon atoms of the bifunctional radical Y can form part of a five-membered to seven-membered cycloalkyl radical or of an aromatic ring system, preferably with six carbon atoms. The cycloalkyl radicals or the aromatic systems can carry as substituents one or more of the groups R' and R'' defined above. Y is preferably a nongeminal alkylene group of two to four carbon atoms, especially ethylene, 1,3-propylene and 1,2-propylene.

By the term "lower alkyl" is intended a straight or branched chain monovalent hydrocarbon group of from one to six carbon atoms, such as methyl, ethyl, propyl, isopropyl, butyl, sec-butyl, tert.butyl, pentyl, hexyl and the like. Derivative groups such as lower alkoxy, lower alkylene and the like are similarly defined, insofar as the hydrocarbon portion of the group is concerned.

Preferred alkyl groups are those containing one to four carbon atoms.

Preferred aryl groups, as well as the preferred aryl components of the aralkyl radicals $R^1$, $R^2$, $R^3$ and $R^4$, are those containing six carbon atoms, e.g. phenyl.

Preferred alkyl components of the aralkyl groups $R^1$, $R^2$, $R^3$ and $R^4$ are those containing one to four carbon atoms.

The heterocyclic radicals $R^1$, $R^2$, $R^3$ and $R^4$ are saturated or unsaturated and preferably consist of five or six ring members. They can contain one to three, preferably one or two, identical or different hetero-atoms, such as nitrogen, oxygen or sulphur.

If $R^1$ and $R^2$ together with the nitrogen atom to which they are attached form a heterocyclic ring, this ring is saturated or unsaturated and preferably contains five, six or seven ring members. This heterocyclic ring can contain one or two nitrogen, oxygen or sulphur atoms as further hetero-atoms. It can also contain one or more, preferably one or two, keto groups. Particularly preferred heterocyclic radicals are the phthalimidyl-1 azacycloheptan-2-on-1-yl groups.

The alkyl radicals R, $R^1$, $R^2$, $R^3$ and $R^4$, the aryl, aralkyl and heterocyclic radicals $R^1$, $R^2$, $R^3$ and $R^4$, and the heterocyclic rings formed by $R^1$ and $R^2$ with the amide nitrogen atmo can contain one or more, preferably one or two, identical or different substitutents.

Examples of optional substituents in the alkyl radical R are halogen, such as fluorine, chlorine, bromine and iodine, atoms, nitro, lower alkyl or lower alkoxy, the latter two groups preferably containing one to four carbon atoms.

Possible substituents in $R^1$, $R^2$, $R^3$ and $R^4$, and in the rings formed by $R^1$ and $R^2$ with the amide nitrogen atom, are halogen atoms, nitro, lower alkyl and lower alkoxy, the latter two groups with preferably one to four carbon atoms, especially methyl or ethyl.

More specifically, the compounds of the present invention can be represented by the following formula:

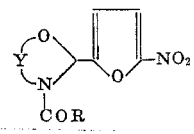

(1A)

in which
R is lower alkyl, halo(lower alkyl),

$OR^3$,

or $COOR^3$ in which:
each of $R^1$ and $R^2$, when taken independently of the other is hydrogen, lower alkyl, hydroxy(lower alkyl), phenyl or halophenyl, or $R^1$ and $R^2$, when taken together with the nitrogen atom to which they are attached, together are a five to seven membered monocyclic or fused benzo heterocyclic ring;
$R^3$ is hydrogen, lower alkyl, halo(lower alkyl), cycloalkyl or phenyl(lower alkyl); and
Y is a nongeminal alkylene chain of two to four carbon atoms.

A preferred group of the compounds of the invention comprises those of the formula:

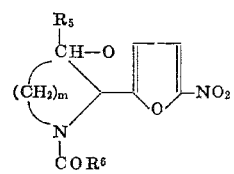

(6)

in which
$R^5$ is a hydrogen atom or a methyl group;
m is 1 or 2;
$R^6$ is a chloromethyl, dichloromethyl, amino, alkoxy, or a group of the formula:

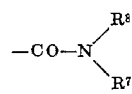

(7)

in which
$R^7$ and $R^8$ are the same or different and is each a hydrogen atom, an alkyl group having one to three carbon atoms and optionally substituted by a hydroxyl group, a chlorophenyl group, or when taken together with the nitrogen atom to which they are attached, phthalimidyl-1 or azacycloheptanon-2-yl-1; or $—COOR^9$ in which $R^9$ is hydrogen, methyl, or ethyl.

The compound of the formula:

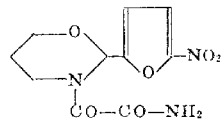

(8)

displays a particularly good activity.

The present invention further provides processes for the production of the new compounds of formula (1). In a first process, an N-nitroso compound of the formula:

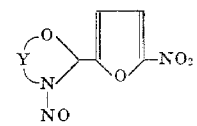

(9)

in which
Y is as defined above,
is allowed to react with a compound of the formula:

$$RCOX$$

(10)

in which
X is halogeno and R is as defined above.

In a second process, a compound of the formula:

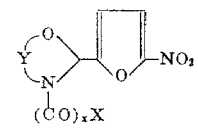

(11)

in which Y and X are as defined above and x is 1 or 2 is allowed to react with a compound of the formula:

(12)

or with a compound of the formula:

$$HOR^3$$

(13)

in which $R^1$, $R^2$ and $R^3$ are as defined above.

Intermediates of formula (11) are prepared with or without isolation, through the reaction of a compound of formula (9) with phosgene [to yield the intermediate of formula (11) in which x is 1] or with an oxalyl halide, preferably oxalyl chloride [to yield the intermediates of formula (11) in which x is 2].

According to the first process a nitroso compound of formula (9) is allowed to react with, for example, an alkanoic acid halide or haloalkanoic acid halide, such as acetyl chloride, propionyl chloride, chloroacetyl chloride or the like, with a chloroformate as for example ethyl chloroformate or with a chloroformamide such as carbamyl chloride.

According to the second process, an intermediate of formula 9 is treated with ammonia, a primary or secondary amine such as ethylamine, dimethylamine, methyl ethylamine, aniline or the like, an alcohol such as methanol, ethanol, benzyl alcohol, cyclopentanol, cyclohexanol or the like, or with water.

The reaction products of either process can be isolated by any suitable methods.

The halogen atom X is chlorine or bromine.

The reactants in both processes are generally employed in substantially equimolar amounts. When hydrogen halide acids are generated in the reaction, inorganic bases such as alkali metal carbonates, alkaline earth metal carbonates (for example $K_2CO_3$ or $Na_2CO_3$) or organic bases (for example tertiary lower alkylamines) can be added as acid-binding agents. When an amine is a reactant, an excess can also be employed as the acid-binding agent.

The processes of the invention are generally carried out in an inert organic solvent, such as an optionally halogenated aliphatic and aromatic hydrocarbon, as for example benzene, methylene chloride and chloroform, an ether such as diethyl ether or tetrahydrofuran, and esters, such as ethyl acetate, at temperatures of from about $-30°$ to about $150°$ C, preferably between $20°$ and $80°$ C.

The starting materials of formula (9) can be obtained through the reaction of an aminoalkanol of the formula:

$$H_2N-Y-OH \quad (14)$$

in which

Y is as defined above, with approximately the equivalent amount of 5-nitrofurfural and at least one mol of nitrous acid (or a compound which yields nitrous acid) in the presence of an inert organic solvent, for example, an ether such as diethyl ether, tetrahydrofuran or dioxane, a ketone such as acetone or diethyl ketone, or a liquid amide such as dimethylformamide, in the temperature range of from about $-30°$ C to about $-20°$ C, preferably $-5°$ C to $+5°$ C.

The invention is further illustrated by the following examples in which all temperatures are given in °C.

EXAMPLE 1

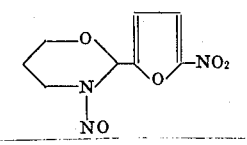
(15)

190 g of 1,3-aminopropanol are mixed with 730 ml of water and then, while cooling, with 250 ml of glacial acetic acid. 142.5 g of nitrofurfurol, dissolved in 150 ml of dioxane, are then stirred in at 0° C, 175 g of sodium nitrite in 300 ml of water are added dropwise to this mixture at 0° C, and the reaction batch is stirred for a further 16 hours at 0° C. The reaction product precipitates and is filtered off and recrystallized from tetrahydrofurane/ether. Yield of 2-(5-nitrofuryl-2)-3-nitrosotetrahydrooxazine-1,3, 131 g, melting point 130° – 132° C.

The remaining nitroso compounds of this type employed as starting compounds can be obtained in an analogous manner.

EXAMPLE 2

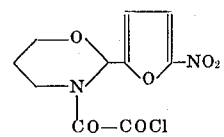
(16)

22.7 g (0.1 mol) of 2-(5-nitrofuryl-2)-3-nitrosotetrahydrooxazine-1,3 are suspended in 100 ml of absolute benzene and then added, at 30° C, to a solution of 13 g (0.11 mol) of oxalyl chloride in 20 ml of absolute benzene, and the mixture is stirred for 2 hours at 40° C. After evaporating off the solvent, colorless 2-(5-nitrofuryl-2)-3-(chlorocarbonyl-carbonyl)-tetrahydrooxazine-1,3 is obtained, which is practically pure for the purpose of further reactions, and which is characterized by bands in the infrared at 1,770 cm$^{-1}$ (—COCl) and 1670 cm$^{-1}$

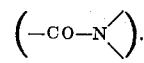

EXAMPLE 3

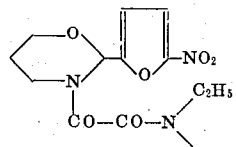
(17)

The acid chloride obtained according to Example 2 is taken up in 100 ml of absolute benzene and treated with 7.3 g (0.1 mol) of diethylamine in 20 ml of absolute benzene. After completion of the reaction, a further 7.3 g of diethylamine in 10 ml of benzene are added. After evaporating off the solvent in vacuo, the residue is taken up in methylene chloride and filtered, and the filtrate is concentrated and chromatographed on aluminium oxide, activity level II. Elution with petroleum ether, ether and methylene chloride yields 3 fractions, of which the ether fraction, after evaporation, contains 7 g of the compound 2-(5-nitrofuryl-2)-3-(diethylaminocarbonylcarbonyl)-tetrahydrooxazine-1,3 [alternatively named as 2-(5-nitrofuryl-2)-3-(N,H-diethylcarboxamidocarbonyl)-tetrahydrooxazine-1,3] in the form of white crystals of melting point 94° – 96° C, and the methylene chloride fraction only contains traces of this compound.

$C_{14}H_{19}N_3O_6$ (325.32). Mass number found: 325

| | | | | |
|---|---|---|---|---|
| Calculated: | C 51.70% | H 5.88% | N 12.92% | O 29.50% |
| Found | C 52.1% | H 6.2% | N 13.0% | O 29.41% |

EXAMPLE 4

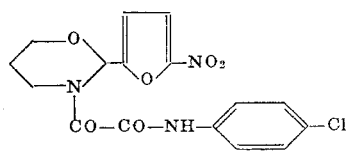
(18)

The acid chloride obtained according to Example 2 is taken up in 100 ml of absolute benzene and treated with a solution of 13 g of p-chloroaniline in 50 ml of absolute benzene, the mixture is warmed for 1 hour at 80° C, the solvent is evaporated off, the residue is dissolved in a little hot dimethylformamide, the solution is filtered, and the filtrate is treated with ethyl acetate until it begins to turn cloudy. 6.0 g of 2-(5-nitrofuryl-2)-3-(p-chlorophenylaminocarbonylcarbonyl)-tetrahydrooxazine-1,3 [alternatively named as 2-(5-nitrofuryl-2)-3-[N-(p-chlorophenyl)carboxamidocarbonyl]tetrahydrooxazine-1,3] are thus obtained as white crystals of melting point 215° C.

The Beilstein test is positive, and the IR spectrum agrees with the structure indicated.
$C_{16}H_{14}ClN_3O_6$ (379.77). Mass number found: 379

| | | | | |
|---|---|---|---|---|
| Calculated: | C 50.6% | H 3.71% | N 11.05% | O 25.29% | Cl 9.35% |
| Found: | C 51.5% | H 4.5% | N 10.9% | O 22.8% | Cl 11.2% |

EXAMPLE 5

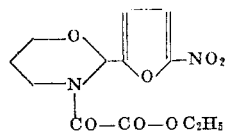
(19)

The acid chloride obtained according to Example 2 is taken up in 200 ml of absolute benzene and a mixture of 50 ml of ethanol and 9 g of triethylamine is added thereto. The mixture is stirred for 2 hours at room temperature (about 20° C) and volatile materials are evaporated off in vacuo. 42 g of residue are left, and these are taken up in methylene chloride and the solution washed with water. Chromatography on silica gel, using chloroform, yields 22 g of light orange oil, which in the IR spectrum shows two CO bands at 1,650 and 1,730 cm$^{-1}$.

2-(5-Nitrofuryl-2)-3-(ethoxycarbonyl-carbonyl)-tetrahydrooxazine-1,3, of melting point 92°, is obtained from ethyl acetate/ether [and is alternatively named as 2-(5-nitrofuryl-2)-3-carbethoxycarbonyl-tetrahydrooxazine-1,3].

$C_{12}H_{14}N_2O_7$ (298.26). The NMR shows the bands to be expected for the indicated structure.

| | | | | |
|---|---|---|---|---|
| Calculated: | C 48.4% | H 4.74% | N 9.40% | O 37.5% |
| Found: | C 48.2% | H 4.7% | N 9.3% | O 37.4% |

EXAMPLE 6

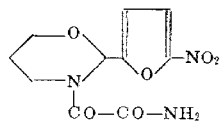
(8)

The acid chloride obtained according to Example 2 is dissolved in 100 ml of absolute benzene and gaseous NH$_3$ is passed into the solution through a wide inlet tube until a dark coloration occurs. The mixture is stirred for a further 2 hours at 40° C and the volatile materials evaporated off in vacuo. 23 g of a thick resin which is soluble in hot water are left. It is taken up in methylene chloride and allowed to crystallize. After recrystallization from methylene chloride or ethyl acetate, 13 g of 2-(5-nitrofuryl-2-)-3-(carboxamidocarbonyl)-tetrahydrooxazine-1,3 are obtained. Melting point 159° – 162° C.

$C_{10}H_{11}N_3O_6$ (269.2)

| | | | | |
|---|---|---|---|---|
| Calculated: | C 44.60% | H 4.12% | N 15.60% | O 35.68% |
| Found: | C 44.9% | H 4.3% | N 15.5% | O 35.7% |

EXAMPLE 7

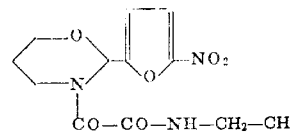
(20)

The acid chloride obtained according to Example 2 is dissolved in 100 ml of absolute benzene and rapidly added dropwise to a solution, cooled to 0° C, of 23 g (0.3 M) of 1-aminopropanol-(3) in 100 ml of absolute tetrahydrofurane. The mixture is brought to room temperature and then poured onto ice; after acidification with hydrochloric acid, the mixture is extracted with methylene chloride, the organic phase is dried, and the solvent is stripped off in vacuo. The crystals obtained in this manner (27 g) are first dissolved in ethyl acetate, the mixture is filtered hot in the presence of active charcoal, sufficient petroleum ether is added to cause a cloudiness, and the mixture is allowed to crystallize. The 2-(5-nitrofuryl-2)-3-[N-(3-hydroxypropyl)carboxamidocarbonyl]-tetrahydro-oxazine-1,3 thus obtained has a melting point of 135° C. In a thin layer chromatogram the substance appears as one compound only, and the mass number, NMR spectrum and IR spectrum agree wholly with the structure indicated.

$C_{13}H_{17}N_3O_7$ (327.3)

| | | | | |
|---|---|---|---|---|
| Calculated: | C 47.74% | H 5.23% | N 12.84% | O 34.10% |
| Found: | C 48.7% | H 5.6% | N 12.7% | O 33.0% |

EXAMPLE 8

<chemical structure>
COCO—NH—CH₂—CH₂—OH    (21)
</chemical structure>

The acid chloride obtained according to Example 2 is dissolved in 100 ml of absolute benzene. 18.3 g (0.3 mol) of 1,2-aminoethanol are added dropwise to this solution. The mixture is stirred further, the solvent is evaporated off in vacuo, the residue is taken up in methylene chloride, the solution is washed with water, the organic phase is concentrated, and the residue is recrystallized from ethyl acetate/petroleum ether. The 2-(5-nitrofuryl-2)-3[N-(β-hydroxy-ethyl)-carboxamidocarbonyl]-tetrahydrooxazine-1,3 thus obtained has a melting point of 105° C. The mass number 313 which is found, and the NMR and IR spectrum, are in entire agreement with the structure.
$C_{12}H_{15}N_3O_7$ (313.27)

| | | | | |
|---|---|---|---|---|
| Calculated: | C 46.0% | H 4.83% | N 13.41% | O 35.76% |
| Found: | C 45.9% | H 4.8% | N 13.2% | O 35.7% |

EXAMPLE 9

<chemical structure>
CO—COOH    (22)
</chemical structure>

The acid chloride obtained according to Example 2 is treated with a saturated aqueous sodium bicarbonate solution until almost complete solution occurs. A little insoluble matter is then filtered off and the alkaline filtrate is again filtered, using active charcoal. The solution is carefully acidified to pH 2 with 1 N HCl at about 0° C, and the white precipitate is filtered off. 12 g of 2-(5-nitrofuryl-2)-3-(carboxy-carbonyl)-tetrahydrooxazine-1,3 of melting point 90° – 92° C are obtained from tetrahydrofurane/ether/petroleum ether. The mass spectrum, NMR spectrum and IR spectrum are in agreement with the structure.
Mass found: 270.
$C_{10}H_{10}N_2O_7 \cdot 1H_2O$ (288.22)

| | | | | |
|---|---|---|---|---|
| Calculated: | C 41.70% | H 4.50% | N 9.70% | O 44.44% |
| Found: | C 41.9% | H 4.4% | N 9.6% | O 44.6% |

EXAMPLE 10

<chemical structure>
CO—CH₂Cl    (23)
</chemical structure>

22.7 g of the nitroso compound obtained according to Example 1 suspended in 150 ml of absolute benzene and stirred for 4 hours with 12 g (0.11 mol) of chloroacetyl chloride at 50° C. The mixture is evaporated to dryness in vacuo and 9 g of 2-(5-nitrofuryl-2)-3-chloroacetyl-tetrahydrooxazine-1,3 are crystallized from ethyl acetate; after recrystallization from ethyl acetate/ether, with filtration using active charcoal, the substance shows a melting point of 109° C.
$C_{10}H_{11}ClN_2O_5$ (274.7)

| | | | | |
|---|---|---|---|---|
| Calculated: | H 4.04% C 43.72% | Cl 12.91% | N 10.20% | O 29.13% |
| Found: | H 4.4% C 43.9% | Cl 12.7% | N 10.6% | O 29.2% |

The NMR spectrum and IR spectrum correspond to the structure indicated.

EXAMPLE 11

22.7 g of the nitroso compound obtained according to Example 1 in 150 ml of absolute benzene, together with 15 g of dichloroacetyl chloride, are kept at 40° C for 4 hours, and the solvent is subsequently evaporated in vacuo. 25 g of the compound of the formula <chemical structure>
CO—CHCl₂    (24)
</chemical structure> are obtained as the crude yield, and this material yields 6.3 g of pure crystals, of melting point 135° – 136° C, from ethyl acetate/ether (active charcoal).
$C_{10}H_{10}Cl_2N_2O_5$ (309.12)

| | | | | | |
|---|---|---|---|---|---|
| Calculated: | C 38.85% | H 3.25% | N 9.05% | O 25.85% | Cl 22.9% |
| Found: | C 39.1% | H 3.6% | N 9.2% | O 26.0% | Cl 22.7% |

EXAMPLE 12

<chemical structure>
CO—NH₂    (25)
</chemical structure>

45.4 g of the nitroso compound obtained according to Example 1 are dissolved in 500 ml of absolute dioxane and 200 ml of absolute ether, and 100 g of phosgene are passed in at 0° C. The reaction batch is kept for 60 hours at 0° C, the solvent is then evaporated in vacuo, and the residue is taken up in 400 ml of absolute benzene and treated with gaseous ammonia until the absorption of ammonia ceases. The product which precipitates is well washed with water, and the residue is crystallized from ethyl acetate. 19.8 g of 2-(5- nitrofuryl-2)-3-carboxamido-tetrahydrooxazine-1,3 are obtained. Melting point 150° (decomposition).
$C_9H_{11}N_3O_5$ (241.20)

| Calculated: | C 44.82% | H 4.60% | N 17.43% |
|---|---|---|---|
| Found: | C 45.0% | H 4.7% | N 17.3% |

EXAMPLE 13 [Preparation of N-nitroso starting compound]

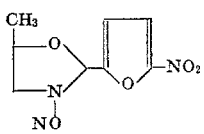
(26)

28 g of nitrofurfurol (0.2 mol), dissolved in 100 ml of dioxane, and 27g of sodium nitrite (0.4 mol), dissolved in 100 ml of water, are dripped simultaneously over the course of 5 hours, at 0° C, into a solution of 30 g (0.4 mol) of 2-hydroxypropylamine in 100 ml of water and 100 ml of glacial acetic acid. The reaction mixture is stirred for 16 hours at 0° C, added to ice and rendered alkaline with sodium carbonate, and the product is filtered off. 2-(5-Nitrofuryl-2)-3-nitroso-5-methyl-oxazolidine-1,3is obtained in a crude yield of 48 g. After recrystallization from ethanol, the compound is obtained as a colorless substance of melting point 95° C.
$C_8H_9N_3O_5$ (227.17)

| Calculated: | C 42.3% | H 4.0% | N 18.5% |
|---|---|---|---|
| Found: | C 42.6% | H 4.2% | N 18.6% |

The remaining nitroso compounds of this type which can be used as starting substances can be obtained in an analogous manner.

EXAMPLE 14

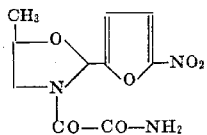
(27)

22.7 g of the nitroso compound described in the above Example No. 13 are suspended in 200 ml of absolute benzene, 15 g of oxalyl chloride are added at 0° C, and the mixture is warmed to 60° C, whereupon a solution results. The solution is warmed to 60° C for 1 hour, the solvent is evaporated off in vacuo, and the residue is taken up in 100 ml of absolute benzene and treated with 250 ml of an 0.8 molar solution of $NH_3$ in dioxane. After being left to stand overnight, the solvent is evaporated in vacuo, and the residue is washed with water and recrystallized from tetrahydrofuran/petroleum ether. 2-(5-Nitrofuryl-2)-3-(carboxamidocarbonyl)-5-methyl-oxazolidine-1,3 is obtained in the form of white crystals of melting point 164° – 165° C.

$C_{10}H_{11}N_3O_6$ (269.21)

| Calculated: | C 44.62% | H 4.12% | N 15.61% |
|---|---|---|---|
| Found: | C 45.0% | H 4.6% | N 15.4% |

EXAMPLE 15

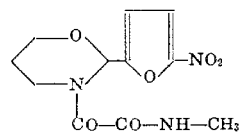
(28)

The acid chloride obtained according to Example 2 is taken up in 800 ml of absolute benzene. Methylamine is introduced in gaseous form into this solution. The end of the reaction is discerned from the colour change of the solution. A drop of the solution put onto moist $p_H$ - paper shows a $p_H$ of 9 – 10. After standing for 16 hours, the solution is washed with water and then evaporated in a vacuum. The residue is recrystallized from acetonitrile and then from cyclohexane. The 2-(5-nitrofuryl-2)-3-methylaminocarbonyl-carbonyl-tetrahydrooxazine-1,3 obtained [alternatively named as 2-(5-nitrofuryl-2)-3-(N-methylcarboxamidocarbonyl)tetrahydrooxazine-1,3] has an m.p. 138°–140° C.
$C_{11}H_{13}N_3O_6$ (283.23)

| Calculated: | C 46.64% | H 4.63% | N 14.84% |
|---|---|---|---|
| Found: | C 46.7% | H 4.8% | N 14.7% |

EXAMPLE 16

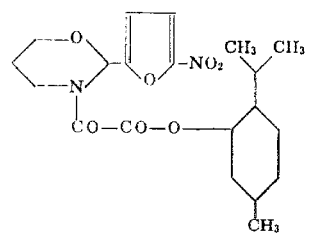
(29)

The acid chloride obtained according to Example 2 is taken up in 200 ml of absolute benzene, and a solution of 16 g 1-menthol and 10 g triethylamine in 100 ml of absolute benzene is added dropwise. After standing for 16 hours, the mixture is washed with water, dried, and evaporated in a vacuum. By recrystallization from ethanol, 2-(5-nitro-furyl-2)-3-1-menthyloxycarbonyl-carbonyl-tetrahydro-oxazine-1,3 is obtained in the form of colorless crystals m.p. 82°–83° C $\alpha_D^{20}$ : −38.18.

$C_{20}H_{28}N_2O_7$ (408.43)

| Calculated: | C 58.81% | H 6.91% | N 6.86% |
|---|---|---|---|
| Found: | C 58.8% | H 6.9% | N 6.7% |

EXAMPLE 17

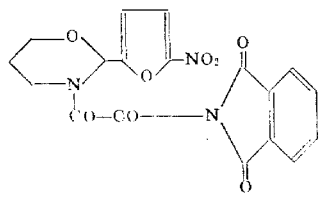
(30)

The acid chloride obtained according to Example 2 is taken up in 100 ml of absolute benzene. 18.5 g (0.1 mol) of dried, finely powdered potassium phthalimide are introduced in portions, with vigorous stirring; heating under reflux is effected for 1 hour, followed by cooling and filtration. From the filtrate there is obtained, after addition of ether and petroleum ether, 18 g 2-(5-nitro-furyl-2)-3-phthalimidocarbonyl-carbonyl-tetrahydro-oxazine-1,3 which are recrystallized from tetrahydrofuran/ether with the addition of active carbon. m.p. 204° C decomp.
$C_{18}H_{13}N_3O_8$ (399.33)

| | | | | |
|---|---|---|---|---|
| Calculated: | C 54.13% | H 3.28% | N 10.53% | O 32.06% |
| Found: | C 53.9% | H 3.8% | N 10.3% | O 32.2% |

EXAMPLE 18

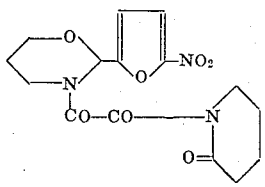

(31)

The acid chloride obtained according to Example 2 is dissolved in 100 ml of absolute benzene and a solution of 12 g caprolactam in 40 ml of absolute benzene is added; heating under reflux is effected for half an hour, 10 g anhydrous sodium acetate are added and heating under reflux is continued for a further 3 hours. After evaporation of the solvent in a vacuum the residue is extracted hot with tetrahydrofuran. This extract is evaporated in a vacuum, shaken three times with water and decanted. The residue is taken up in methanol, clarified with active carbon and, finally, precipitated by addition of water, 2-(5-nitrofuryl-2)-3-N-(azacycloheptanone-2)-carbonyl-carbonyl-tetrahydrooxazine-1,3 m.p. 70° – 72° C being obtained [alternatively named 2-(5-nitrofuryl-2)-3-[N,N-(1-oxohexamethylene)carboxamidocarbonyl]tetrahydrooxozine-1,3].
$C_{16}H_{19}N_2O_7$ (365.16)

| | | | | |
|---|---|---|---|---|
| Calculated: | C 52.60% | H 5.25% | N 11.50% | O 30.68% |
| Found | C 51.2% | H 5.2% | N 10.9% | O 30.9% |

Molecular weight (in a mass spectrometer) found 385 ME.

EXAMPLE 19

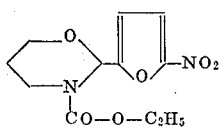

(32)

22.7 g of the nitroso compound described according to the foregoing Example No. 1 are heated with 30 g ethyl chloroformate until the end of evolution of gas, the excess ethyl chloroformate is distilled off in a vacuum. The residue is chromatographed, using $SiO_2$ with chloroform as eluant. The first fractions of this chromatography yielded, after distillation at 140°/0.005 mm, 2-(5-nitrofuryl-2)-3-ethoxycarbonyl-tetrahydrooxazine-1,3 as colorless substance of m.p. 49°–51° C.
$C_{11}H_{14}N_2O_6$ (270.23)

| | | | |
|---|---|---|---|
| Calculated: | C 48.89% | H 5.23% | N 10.37% |
| Found: | C 49.1% | H 5.5% | N 10.3. |

EXAMPLE 20

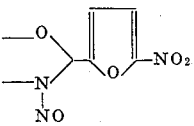

(33)

To a solution of 24 g ethanolamine in 100 ml of water / 100 ml glacial acetic acid there are simultaneously added dropwise at 0° C a solution of 28 g nitrofurfurol (0.2 mol) in 100 ml dioxan and a solution of 27 g sodium nitrite in 100 ml of water. After standing for 16 hours at 0° C ice is added to the solution and it is neutralised with sodium carbonate. The 2-(5-nitrofuryl-2)-3-nitroso-oxazolidine-1,3 is filtered off with suction. After recrystallization twice, colorless crystals of m.p. 82°–85° C are obtained.
$C_7H_7N_3O_5$ (213.14)

| | | | |
|---|---|---|---|
| Calculated: | C 39.45% | H 3.31% | N 19.72% |
| Found: | C 39.6% | H 3.5% | N 19.6% |

EXAMPLE 21

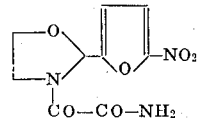

(34)

42.6 g of the nitroso compound obtained according to the foregoing example No. 20 are suspended in 300 ml of absolute benzene, a solution of 38.1 g (0.3 mol) oxalyl chloride in 100 ml of absolute benzene is added at 0° – 10° C, and stirring is afterwards effected for 5 hours. The solution is filtered clear and evaporated in a vacuum. The residue (50 g) is taken up in 400 ml of absolute benzene and introduced into the solution at 15° C with gaseous ammonia until there is slight brown coloration. (One drop of solution put on to moist $p_H$ paper shows a $p_H$ of 9 – 10). Stirring is afterwards effected for 1 hour and the 2-(5-nitro-furyl-2)3-carboxamido-carbonyloxazolidine-1,3 together with ammonium chloride is filtered off with suction. After dissolving in acetonitrile, filtration and addition of ether/petroleum ether to the filtrate, 25 g of colorless crystals m.p. 170°–174° C are obtained. The constitution was determined by NMR and IR spectra.
$C_9H_9N_3O_6$ (255.2)

| Calculated: | C 42.35% | H 3.55% | N 16.46% | O 37.64% |
| --- | --- | --- | --- | --- |
| Found | C 43.6% | H 4.2% | N 15.7% | O 36.8% |

As already mentioned, the new compounds are useful for the treatment of microbial diseases, i.e. those caused by pathogenic bacteria, for example Klebsiella, mycoplasmas, fungi, for example *Candida albicans*, and *protozoa*, for example Trichomonades and Lambliae.

Activity against worms, such as, for example, threadworms, can also be observed.

The activity of the new compounds can be conveniently observed in vitro and in vivo.

Thus for example, the compound of Example 6 shows the following anti-microbial activities when tested in vitro in the serial dilution test (either Klein medium, pH 7, or PPLO medium, pH 7.6):

| Microbe | Minimum Inhibitory Concentration in γ/ml |
| --- | --- |
| Klebs. pneum. 8085 | 50 |
| Strept. pyogenes C | 50 |
| Mycoplasma gallisepticum | 6.25 |
| do. granularum | 6.25 |
| do. bovirhinis | 12.5 |

In animal experiments, a good reaction is especially evident in systemic infections caused by bacteria such as Salmonella, Klebsiella and Aeromonas, and by fungi such as *Candida albicans*.

A high blood level found in animal experiments should be emphasized particularly. Thus in the rabbit model, the following blood levels were achievable after oral and subcutaneous administration of the compound of Example 6:

| oral administration: | after 1 hour , 7.5 γ/ml of serum |   |
| --- | --- | --- |
|  | do. 2 hours, 6.0 γ/ml | do. |
|  | do. 3 hours, 4.0 δ/ml | do. |
| subcutaneous administration: | after 1 hour, 9.0 γ/ml of serum |   |
|  | do. 2 hours, 8.0 γ/ml | do. |
|  | do. 3 hours, 5.0 γ/ml | do. |

In mice, the compound of Example 6 is very rapidly absorbed after oral administration. After administering 100 mg/kg of body weight, blood levels of 8–11 γ/ml were found at 0.5 to 1 hour, 4γ/ml after 2 to 3 hours and 1.5 γ/ml after 4 to 5 hours. 8 hours after administration, the compound was no longer detectable in the blood.

Using the model of experimental candidosis in mice, the compound of Example 6 on oral administration of 100 mg/kg given twice on the day of the infection showed a good antimycotic action; 16 to 18 out of 20 animals survived on the 6th day after infection while in the untreated control group only 2 out of 20 animals survived.

On oral administration of the compound of Example 12 to mice infected by Klebsiella, at a dosage of 3 mg/kg of body weight 2 hours before infection, at the time of the intraperitoneal infection, and at 3, 5, 21 and 29 hours after the infection, 100 percent of the infected mice still survived on the 2nd day after infection while in the untreated control group only 40 percent survived.

This invention thus also provides the pharmaceutical method of treating microbial infections with these new nitrofuran derivatives, and pharmaceutical composition containing as an active ingredient at least one of these compounds in admixture with a pharmaceutically acceptable solid or liquid diluent or carrier.

In the present invention the expression "pharmaceutically acceptable diluent or carrier" means a non-toxic substance that when mixed with the active ingredient or ingredients renders it suitable for administration. Other pharmaceutically necessary or desirable ingredients such as salts in correct quantities to render the composition isotonic, buffers, surfactants, coloring and flavoring agents, and preservatives may also be present. Examples of suitable solid and liquid diluents and carriers include buffered aqueous solutions, isotonic saline solutions, syrup and lotion bases, non-toxic organic solvents, such as paraffins (for example petroleum fractions), vegetable oils (for example groundnut oil/sesame oil), alcohols (for example ethyl alcohol or glycerol), glycols (for example propylene glycol or polyethylene glycol) and water; solid excipients, such as, for example, natural rock powders (for example kaolins, clays, talc or chalk), synthetic rock powders (for example highly disperse silica, and silicates), and sugars (for example unrefined sugar, lactose and glucose).

Examples of pharmaceutical compositions according to the invention are ointments, pastes, creams, sprays, lotions, aqueous suspensions, injectable solutions, elixirs, syrups, granules and powders, either free-flowing or compressed into tablets.

The compounds of the present invention are generally administered perorally or parenterally, especially subcutaneously.

One group of preferred pharmaceutical compositions of the invention are therefore those adapted for oral administration. The diluents and carriers used are preferably therefore those that adapt the active ingredient or ingredients for oral administration. Examples of such diluents and carriers are solid vehicles, excipients and lubricants such as glucose, lactose and sucrose, corn and potato starch, sodium carboxymethyl cellulose, ethyl cellulose and cellulose acetate, powdered gum tragacanth, gelatin, alginic acid, agar, stearic acid, sodium, calcium and magnesium stearates, sodium lauryl sulphate, polyvinylpyrollidone, sodium citrate, calcium carbonate, and dicalcium phosphate.

The pharmaceutical compositions of the invention may also contain other non-toxic adjuvants and modifiers such as dyes; emulsifiers, such as non-ionic and anoinic emulsifiers (for example polyoxyethylene-fatty acid esters, polyoxyethylene-fatty alcohol ethers, aklylsulphonates and and arylsulphonates); dispersing agents (for example lignin, sulphite waste lyes, and methyl cellulose); perfumes; flavouring agents; preservatives and biocides.

As stated above, the compounds and pharmaceutically acceptable salts of the invention may also be administered parenterally. A group of preferred pharmaceutical compositions of the invention are therefore those adapted for parenteral injection. The diluents and carriers used are therefore preferably those that adapt the active ingredient for parenteral administration. Examples of such diluents and carriers are solvents and suspending diluents such as water and water-miscible organic solvents, in particular sesame oil, groundnut oil, aqueous propylene glycol, and N,N'-dimethyl formamide. Examples of pharmaceutical compositions of the invention are sterial isotonic saline aqueous solutions of the active ingredient, which may be buffered with a pharmaceutically acceptable buffer and are preferably pyrogen-free.

The pharmaceutical compositions of the invention preferably contain 0.5 to 90 wt. percent of a new compound of the invention or a non-toxic salt thereof.

In general it has proved advantageous to administer amounts of about 20 to about 100 mg/kg of body weight per day in order to achieve effective results. Nevertheless it can at times be necessary to deviate from the amounts mentioned, in particular as a function of the body weight of the test animal or of the nature of the method of administration, but also because of individual response to the medicine, the nature of its formulation and the point in time or interval at which it is administered. Thus it may, in some cases, suffice to use less than the abovementioned minimum amount, while in other cases the upper limit can be exceeded. Where larger amounts are administered, it can be advisable to divide them into several individual administrations over the course of the day. The same dosage range is envisaged for administration in human medicine and in veterinary medicine.

The present invention also provides medicaments in dosage unit form as hereinafter defined comprising as an active ingredient at least one compound of general formula (1) given above, either alone or in admixture with a pharmaceutically acceptable solid or liquid diluent or carrier.

The expression "medicament in dosage unit form" as used in the present specification refers to a medicament in the form of discrete portions each containing a unit dose or a multiple or sub-multiple of a unit dose of the active ingredient; for example, one, two, three or four unit doses or a half, a third or a quarter of a unit dose. A "unit dose" is the amount of the active ingredient to be administered on one occasion and will usually be a daily dose, or for example a half, a third, or a quarter of a daily dose depending on whether the medicament is to be administered once or, for example, twice, three times, or four times a day.

The discrete portions constituting the medicament in dosage unit form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, lozenges, pills, suppositories, or dragees; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

As stated above, the new compounds of general formula (1) may be administered perorally. Preferred medicaments in dosage unit form according to the invention are therefore those adapted for oral administration, such as tablets, pills, dragees, capsules, and cachets, as well as wrapped powders containing the active ingredient in powdered form with a powdered diluent or carrier for suspension in water before being taken.

As stated above the new compounds may also be administered parenterally, particularly subcutaneously. Preferred medicaments in dosage unit form according to the invention are therefore those adapted for parenteral, particularly subcutaneous, injection, such as ampoules containing a measured quantity of a sterile isotonic saline injectable aqueous solution of the new active ingredient, which may be buffered with a pharmaceutically acceptable buffer and are preferably free of pyrogens.

The preferred unit dose for administration of the medicaments of the invention is 1,000 – 9,000 mg. of active ingredient.

The invention further provides a method of combating bacterial, fungal and protozoal infections in an animal which comprises administering to the animal (preferably parenterally or perorally) a pharmaceutical composition according to the invention or a medicament in dosage unit form according to the invention.

What is claimed is:

1. A compound of the formula:

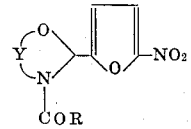

in which
R is lower alkyl, mono- or dihalo(lower alkyl),

$OR^3$,

or $COOR^3$ in which:
   each of $R^1$ and $R^2$, when taken independently of the other is hydrogen, lower alkyl, hydroxy(lower alkyl), phenyl or monohalophenyl, or $R^1$ and $R^2$, when taken together with the nitrogen atom to which they are attached, together are phthalimido or azacycloheptan-2-on-1-yl;
   $R^3$ is hydrogen, lower alkyl, monohalo(lower alkyl), 1-menthyl or phenyl(lower alkyl); and
   Y is ethylene, 1,2-propylene or 1,3-propylene.

2. A compound according to claim 1 wherein R is lower alkyl, monohalo(lower alkyl) or dihalo(lower alkyl) and Y is as therein defined.

3. A compound according to claim 1 wherein R is

and Y is as therein defined.

4. A compound according to claim 1 wherein R is $OR^3$ or $COOR^3$ and Y is as therein defined.

5. The compound according to claim 1 which is 2-(5-nitrofuryl-2)-3-chloroacetyl-tetrahydrooxazine-1,3.

6. The compound according to claim 1 which is 2-(5-nitrofuryl-2)-3-dichloroacetyl-tetrahydrooxazine-1,3.

7. The compound according to claim 1 which is 2-(5-nitrofuryl-2)-3-carboxamido-tetrahydrooxazine-1,3.

8. The compound according to claim 1 which is 2-(5-nitrofuryl-2)-3-(carboxamidocarbonyl)oxazolidine-1,3.

9. The compound according to claim 1 which is 2-(5-nitrofuryl-2)-3-(carboxamidocarbonyl)-5-methyloxazolidine-1,3.

10. The compound according to claim 1 which is 2-(5-nitrofuryl-2)-3-(carboxamidocarbonyl)tetrahydrooxazine-1,3.

11. The compound according to claim 1 which is 2-(5-nitrofuryl-2)-3-(N-methylcarboxamidocarbonyl)tetrahydrooxazine-1,3.

12. The compound according to claim 1 which is 2-(5-nitrofuryl-2)-3-(N,N-diethylcarboxamidocarbonyl)tetrahydrooxazine-1,3.

13. The compound according to claim 1 which is 2-(5-nitrofuryl-2)-3-[N-(β-hydroxyethyl)carboxamidocarbonyl]-tetrahydrooxazine-1,3.

14. The compound according to claim 1 which is 2-(5-nitrofuryl-2)-3-[N-(3-hydroxypropyl)carboxamidocarbonyl]-tetrahydrooxazine-1,3.

15. The compound according to claim 1 which is 2-(5-nitrofuryl-2)-3-[N-(p-chlorophenyl)carboxamidocarbonyl)]-tetrahydrooxazine-1,3.

16. The compound according to claim 1 which is 2-(5-nitrofuryl-2)-3-phthalimidocarbonylcarbonyl-tetrahydrooxazine-1,3.

17. The compound according to claim 1 which is 2-(5-nitrofuryl-2)-3-[N,N-(1-oxohexamethylene)carboxamidocarbonyl]tetrahydrooxazine-1,3.

18. The compound according to claim 1 which is 2-(5-nitrofuryl-2)-3-ethoxycarbonyl-tetrahydrooxazine-1,3.

19. The compound according to claim 1 which is 2-(5-nitrofuryl-2)-3-carboxycarbonyl-tetrahydrooxazine-1,3.

20. The compound according to claim 1 which is 2-(5-nitrofuryl-2)-3-carbethoxycarbonyl-tetrahydrooxazine-1,3.

21. The compound according to claim 1 which is 2-(5-nitrofuryl-2)-3-carbo(1-menthyloxy)carbonyl-tetrahydrooxazine-1,3.

* * * * *